United States Patent
Shaffer et al.

(10) Patent No.: US 9,491,809 B2
(45) Date of Patent: Nov. 8, 2016

(54) INDUCTION COOKTOP APPLIANCE

(71) Applicant: General Electric Company, Schenectady, NY (US)

(72) Inventors: Timothy Scott Shaffer, LaGrange, KY (US); John Stanley Glaser, Niskayuna, NY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 991 days.

(21) Appl. No.: 13/670,572

(22) Filed: Nov. 7, 2012

(65) Prior Publication Data

US 2014/0124501 A1 May 8, 2014

(51) Int. Cl.
*H05B 6/12* (2006.01)

(52) U.S. Cl.
CPC .......... *H05B 6/1254* (2013.01); *Y02B 40/126* (2013.01)

(58) Field of Classification Search
CPC ............ H05B 6/1209; H05B 2213/07; H05B 6/1254
USPC .................. 219/621, 622, 624, 635
See application file for complete search history.

(56) References Cited

U.S. PATENT DOCUMENTS

| 3,085,142 | A | * | 4/1963 | Baermann | F24J 3/00 |
| | | | | | 219/622 |
| 3,836,744 | A | * | 9/1974 | Taketo | H05B 6/1209 |
| | | | | | 219/451.1 |
| 3,949,183 | A | * | 4/1976 | Usami | H05B 6/1209 |
| | | | | | 219/443.1 |
| 4,348,571 | A | | 9/1982 | Dills | |
| 5,401,939 | A | | 3/1995 | Iguchi et al. | |
| 5,532,461 | A | * | 7/1996 | Crummenauer | A47J 27/022 |
| | | | | | 126/390.1 |
| 7,049,563 | B2 | * | 5/2006 | Keishima | H05B 6/1209 |
| | | | | | 219/620 |
| 2005/0205561 | A1 | * | 9/2005 | Keishima | H05B 6/1209 |
| | | | | | 219/621 |
| 2011/0100980 | A1 | * | 5/2011 | Kitaizumi | H05B 6/1245 |
| | | | | | 219/624 |
| 2012/0111854 | A1 | * | 5/2012 | Gaspard | H05B 6/1209 |
| | | | | | 219/650 |

* cited by examiner

*Primary Examiner* — David Angwin
*Assistant Examiner* — Lawrence Samuels
(74) *Attorney, Agent, or Firm* — Dority & Manning, P.A.

(57) ABSTRACT

An induction cooktop appliance is provided. The induction cooktop appliance includes an induction heating element and a metal top panel positioned above the induction heating element for supporting cooking utensils thereon. The metal top panel defines an opening above the induction heating element. The opening can limit or regulate eddy currents within the metal top panel.

12 Claims, 6 Drawing Sheets

INDUCTION COOKTOP APPLIANCE

FIELD OF THE INVENTION

The present subject matter relates generally to induction cooktop appliances.

BACKGROUND OF THE INVENTION

Induction cooktop appliances include an induction heating element that can generate a high-frequency circulating magnetic field. During operation of the cooktop appliance, the magnetic field can induce a circulating electric current within a utensil supported on a top panel of the cooktop appliance. The induced electric current generates heat due to the utensil's relatively poor electrical conductivity and high magnetic permeability. In particular, such characteristics can restrict the induced electrical current's flow thereby heating the utensil and food items located therein.

In order to heat the utensil, the magnetic field generated by the induction heating element must penetrate the cooktop appliance's top panel without incurring significant energy losses. To facilitate such penetration, the top panel preferably avoids heating up due to the magnetic field and thereby sapping power from the utensil supported thereon. Thus, certain induction cooktop appliances include a ceramic top panel. The ceramic material's extremely low electrical conductivity and negligible limited magnetic permeability facilitate efficient power transfer between the induction heating element and the utensil through the top panel.

However, ceramic top panels have certain drawbacks. Consumers can perceive ceramic as fragile and susceptible to cracking or breaking Further, certain consumers prefer a metal surface's appearance and feel over a ceramic surface's appearance and feel. In particular, certain consumers prefer the appearance and feel of stainless steel over ceramic.

Accordingly, an induction cooktop appliance with a metal top panel would be useful. In particular, an induction cooktop appliance with a stainless steel top panel would be useful.

Utilizing a metal top panel on an induction cooktop appliance poses certain challenges. Metal top panels can have a relatively high magnetic permeability and electrical conductivity. Thus, the magnetic field generated by the induction heating element can induce eddy currents within the metal top panel that heats the metal top panel and saps power from the utensil supported thereon.

Accordingly, an induction cooktop appliance with features for limiting or regulating eddy currents within a metal top panel of the induction cooktop appliance would be useful.

BRIEF DESCRIPTION OF THE INVENTION

The present subject matter provides an induction cooktop appliance. The induction cooktop appliance includes an induction heating element and a metal top panel positioned above the induction heating element for supporting cooking utensils thereon. The metal top panel defines an opening above the induction heating element. The opening can limit or regulate eddy currents within the metal top panel. Additional aspects and advantages of the invention will be set forth in part in the following description, or may be apparent from the description, or may be learned through practice of the invention.

In a first exemplary embodiment, an induction cooktop appliance is provided. The induction cooktop appliance includes an induction heating coil and a metal top panel. The metal top panel has a top surface and a bottom surface positioned opposite the top surface. The top surface of the metal top panel is configured for supporting cooking utensils. The bottom surface of the metal top panel is positioned above and faces the induction heating coil. The metal top panel also defines an opening above the induction heating coil. The opening extends through the metal top panel from the top surface of the metal top panel to the bottom surface of the metal top panel. The opening defines a radial direction and a circumferential direction. The opening has plurality of slots that extend along the radial direction. The slots of the plurality of slots are spaced apart from one another along the circumferential direction.

In a second exemplary embodiment, an induction cooktop appliance is provided. The induction cooktop appliance includes an induction heating coil and a metal top panel. The metal top panel has a top surface and a bottom surface positioned opposite the top surface. The top surface of the metal top panel is configured for supporting cooking utensils. The bottom surface of the metal top panel is positioned adjacent the induction heating coil. The metal top panel also defines an opening above the induction heating coil. The opening extends through the metal top panel from the top surface of the metal top panel to the bottom surface of the metal top panel.

In a third exemplary embodiment, an induction cooktop appliance is provided. The induction cooktop appliance includes an induction heating coil and a plurality of metal top panels positioned adjacent the induction heating coil. Each metal top panel of the plurality of metal top panels has a top surface and a bottom surface positioned opposite the top surface. The top surface of the plurality of metal top panels is configured for supporting cooking utensils. The bottom surface of the plurality of metal top panels is positioned above and faces the induction heating coil. The metal top panels of the plurality of metal top panels are spaced apart from one another and define a gap therebetween. At least a portion of the gap is positioned directly above the induction heating coil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
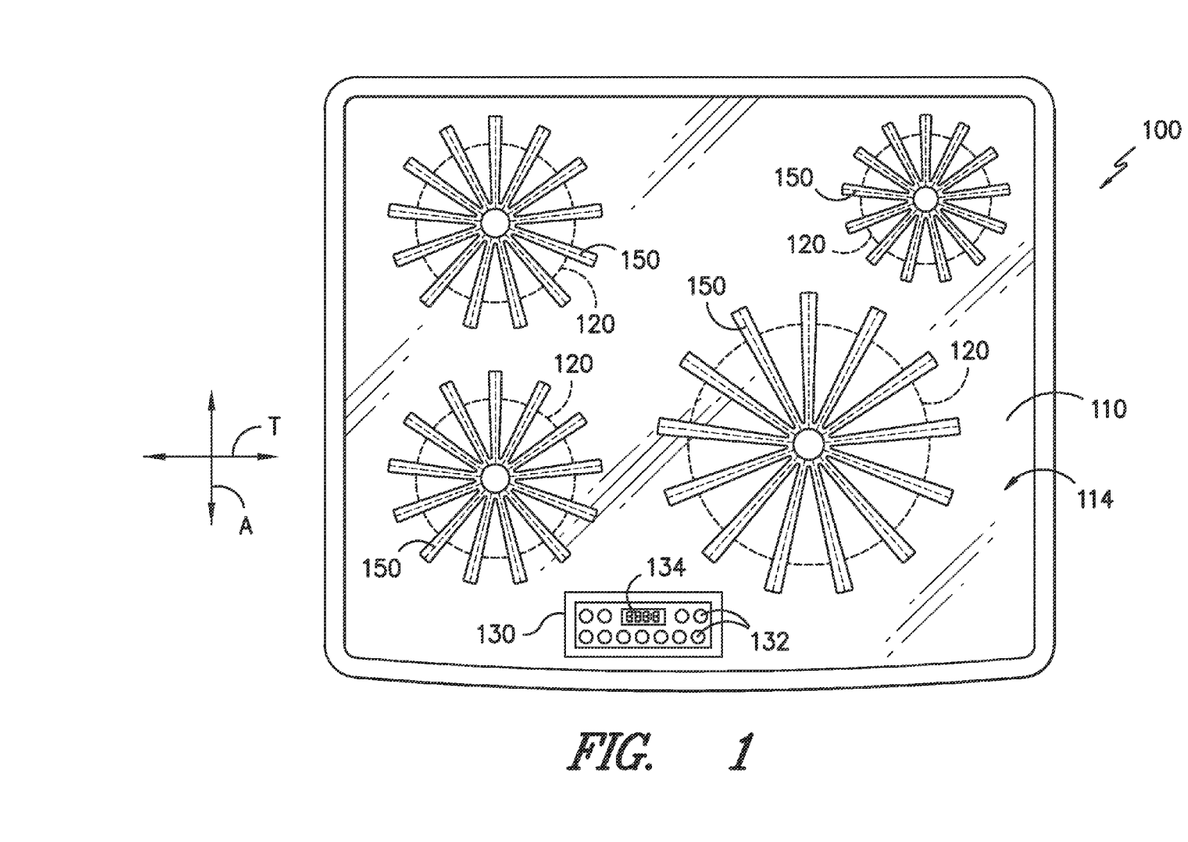
FIG. 1 provides a top, plan view of an induction cooktop appliance according to an exemplary embodiment of the present subject matter. The induction cooktop appliance includes a metal top panel for supporting cooking utensils thereon.

FIG. 1 provides a top, plan view of an induction cooktop appliance 100 according to an exemplary embodiment of the present subject matter. Cooktop appliance 100 can be installed in various locations such as in cabinetry in a kitchen, with one or more ovens to form a range appliance, or as a standalone appliance. Thus, the term "cooktop appliance" includes both stove appliances, range appliances, and other appliances that incorporate cooktops.

Cooktop appliance 100 includes a metal top panel 110 for supporting cooking utensils such as pots or pans. Metal top panel 110 may be constructed from any suitable metal, combination of metals, or combination of predominately metal, e.g., greater than about fifty percent metal, and other materials. As an example, metal top panel 110 may be constructed of stainless steel such as 304 or 316 grade stainless steels.

Induction heating elements or coils 120 are mounted below metal top panel 110 such that induction heating elements or coils 120 are positioned below metal top panel 110 along a vertical direction V (shown in FIG. 2) defined by cooktop appliance 100. The vertical direction V is perpendicular to both a lateral direction A and a transverse direction T defined by cooktop appliance 100 and shown in FIG. 1. While shown with four induction heating elements 120 in FIG. 1, cooktop appliance 100 may include any number of induction heating elements 120 from a single coil to a plurality of coils. As shown in FIG. 1, induction heating elements 120 can have various diameters. For example, each induction heating elements 120 can have a different diameter, the same diameter, or any suitable combination thereof.

Cooktop appliance 100 is provided by way of example only and is in no way limited to the exemplary embodiment shown in FIG. 1. For example, a cooktop appliance having one or more induction heating elements in combination with one or more electric or gas burner heating elements can be provided. In addition various combinations of number of heating elements, position of heating elements and/or size of heating elements can be provided.

A user interface 130 provides visual information to a user and allows a user to select various options for the operation of cooktop appliance 100. For example, displayed options can include a desired induction heating elements 120, a desired cooking temperature, and/or other options. User interface 130 can be any type of input device and can have any configuration. In FIG. 1, user interface 130 is located within a portion of metal top panel 110. Alternatively, user interface 130 can be positioned on a vertical surface near a front side of cooktop appliance 100 or anywhere convenient for a user to access during operation of cooktop appliance 100.

In various exemplary embodiments, user interface 130 can include a capacitive touch screen input device component 132. Capacitive touch screen input device component 132 can allow for the selective activation, adjustment or control of any or all induction heating elements 120 as well as any timer features or other user adjustable inputs. One or more of a variety of electrical, mechanical or electro-mechanical input devices including rotary dials, push buttons, toggle/rocker switches, and/or touch pads can also be used singularly or in combination with capacitive touch screen input device component 132. User interface 130 can also include a display component 134, such as a digital or analog display device designed to provide operational feedback to a user.

Figure 2:
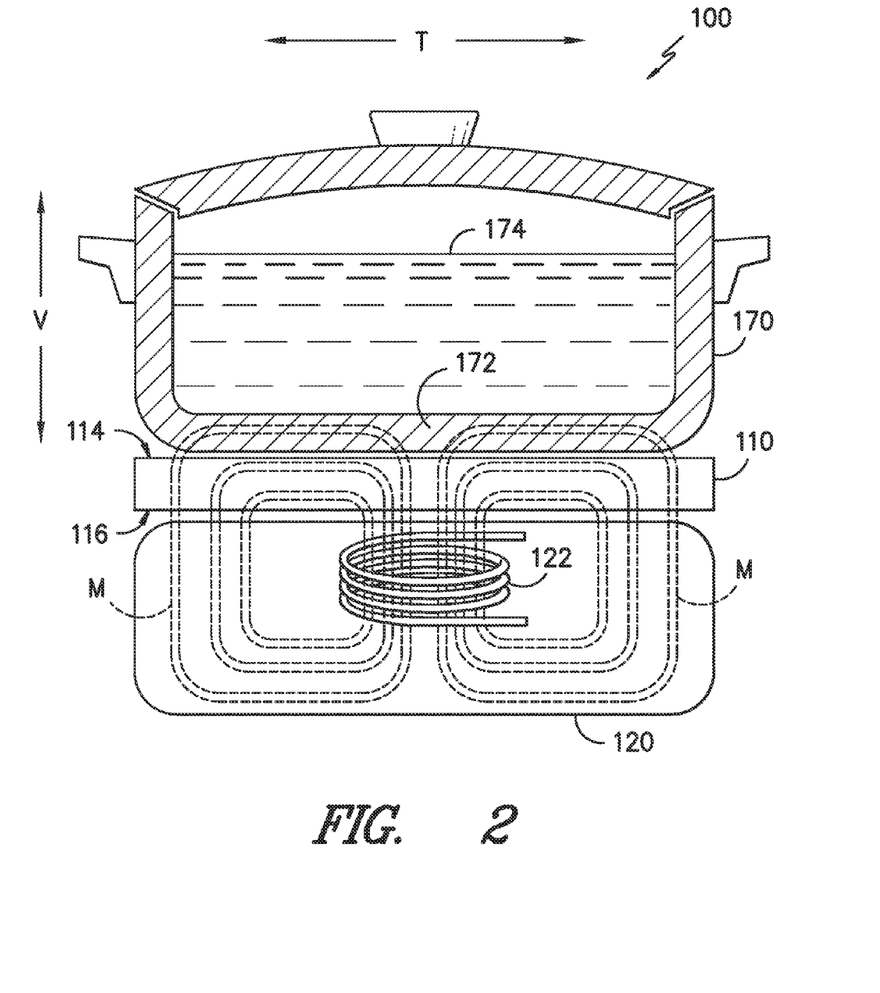
FIG. 2 provides a schematic view of the induction cooktop appliance of FIG. 1 with an induction heating element of the induction cooktop appliance shown heating a cooking utensil supported on the metal top panel of the induction cooktop appliance.

FIG. 2 provides a schematic view of induction cooktop appliance 100 with one of induction heating elements 120 shown heating a cooking utensil 170 supported on metal top panel 110. Metal top panel 110 has a top or cooking surface 114 and a bottom surface 116. Top surface 114 is positioned opposite bottom surface 116 such that top surface 114 and bottom surface 116 are spaced apart, e.g., along the vertical direction V. Top surface 114 is configured for supporting cooking utensil 170. Thus, as shown in FIG. 2, cooking utensil 170 can sit or rest on top surface 114. In particular, a bottom wall 172 of cooking utensil can sit or rest on top surface 114. Bottom surface 116 faces induction heating element 120 such that bottom surface 116 is positioned adjacent induction heating element 120.

Induction heating element 120 includes a Lenz coil or wire 122. As will be understood by those skilled in the art, cooktop appliance 100 can supply a current to Lenz coil 122. As such current passes through Lenz coil 122, Lenz coil 122 generates a magnetic field (shown with dashed lines M). The magnetic field can be a high frequency circulating magnetic field, e.g., with a frequency between about twenty-thousand kilohertz and about thirty-thousand kilohertz. As shown in FIG. 2, Lenz coil 122 can be oriented such that magnetic field M is directed towards and through metal top panel 110 to cooking utensil 170.

As will be understood by those skilled in the art, cooking utensil 170 can be constructed of a material with a relatively poor electrical conductivity and a relatively high magnetic permeability such as iron or steel. Such material properties permit induction heating element 120 to heat cooking utensil 170 during operation of cooktop appliance 100. In particular, when magnetic field M penetrates cooking utensil 170, magnetic field M induces a circulating electrical current within cooking utensil 170, e.g., bottom wall 172 of cooking utensil. The material properties of cooking utensil 170 restrict a flow of the induced electrical current and convert the induced electrical current into heat within cooking utensil 170. As cooking utensil 170 heats up, contents 174 of cooking utensil 170 contained therein heat up as well. In such a manner, induction heating element 120 can cook contents 174 of cooking utensil 170.

As discussed above, metal top panel 110 is constructed of a metal. As will be understood by those skilled in the art and in a similar manner to the mechanism described above to heat cooking utensil 170, induction heating element 120 can also heat up metal top panel 110. However, as discussed in greater detail below, metal top panel 110 includes features hindering induction heating element 120 from inducing a circulating electrical current or eddy current within metal top panel 110. Such features assist within hindering induction heating element 120 from heating up metal top panel 110 and sapping power directed towards cooking utensil 170.

Figure 3:
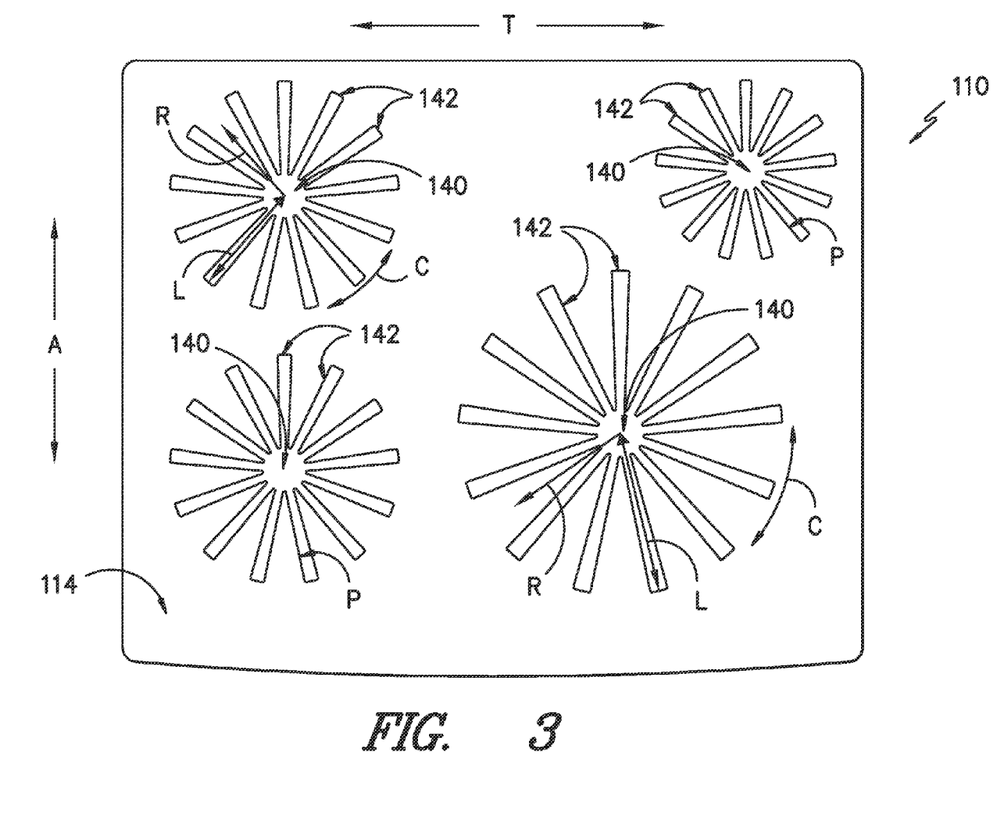
FIG. 3 illustrates a top, plan view of the metal top panel of the induction cooktop appliance of FIG. 1. The metal top panel defines a plurality of openings.

FIG. 3 illustrates a top, plan view of metal top panel 110 of induction cooktop appliance 100 (FIG. 1). As may be seen in FIG. 3, metal top panel 110 defines openings 140, e.g., above each induction heating element 120 (FIG. 1). As discussed in greater detail below, openings 140 obstruct a flow of eddy currents within metal top panel 110 and thereby hinder heating up of metal top panel 110 during operation of cooktop appliance 100. As will be understood by those skilled in the art, each opening 140 need not be a single, continuous opening as shown in FIG. 3. In particular, each opening 140 may be a series of contiguous openings that collectively form the opening 140.

Openings 140 extend through metal top panel 110, e.g., from top surface 114 to bottom surface 116 along the vertical direction V (FIG. 2). Openings 140 each include a plurality of slots 142. In FIG. 3, each opening 140 includes thirteen slots. However, in alternative exemplary embodiments, each opening 140 may include any suitable number of slots. For example, one opening 140 may include ten slots, and another opening 140 may include twelve slots. Thus, openings 140 may have any suitable number of slots, e.g., at least five slots, at least seven slots, at least nine slots, or at least ten slots.

Each slot of plurality of slots 142 extend along a radial direction R defined by metal top panel 110 at each opening of openings 140. In particular, each slot of the plurality of slots has a length L along the radial direction R. Length L may be any suitable distance, e.g., length L may be greater than about three inches, greater than about four inches, greater than about five inches, or more. Selection of length L can assist with hindering eddy current formation within metal top panel 110 as discussed in greater detail below.

Slots of plurality of slots 142 are also spaced apart from one another along a circumferential direction C defined by metal top panel 110 at each opening of openings 140. In particular, slots of plurality of slots 142 are uniformly distributed about the circumferential direction C. However, in alternative exemplary embodiments, plurality of slots 142 may be non-uniformly distributed about the circumferential direction C.

Openings 140 of metal top panel 110 have an outline or perimeter (shown with dashed line P in FIG. 4) in a plane that is perpendicular to the vertical direction V (shown in FIG. 2) or in the same plane as top surface 114 of metal top panel 110. Perimeter P of openings 140 may be any suitable distance. For example, the overall length or distance of perimeter P may be greater than about one hundred inches, greater that about one hundred and fifty inches, or more. Selection of perimeter P can assist with hindering eddy current formation within metal top panel 110 as discussed in greater detail below.

Figure 4:
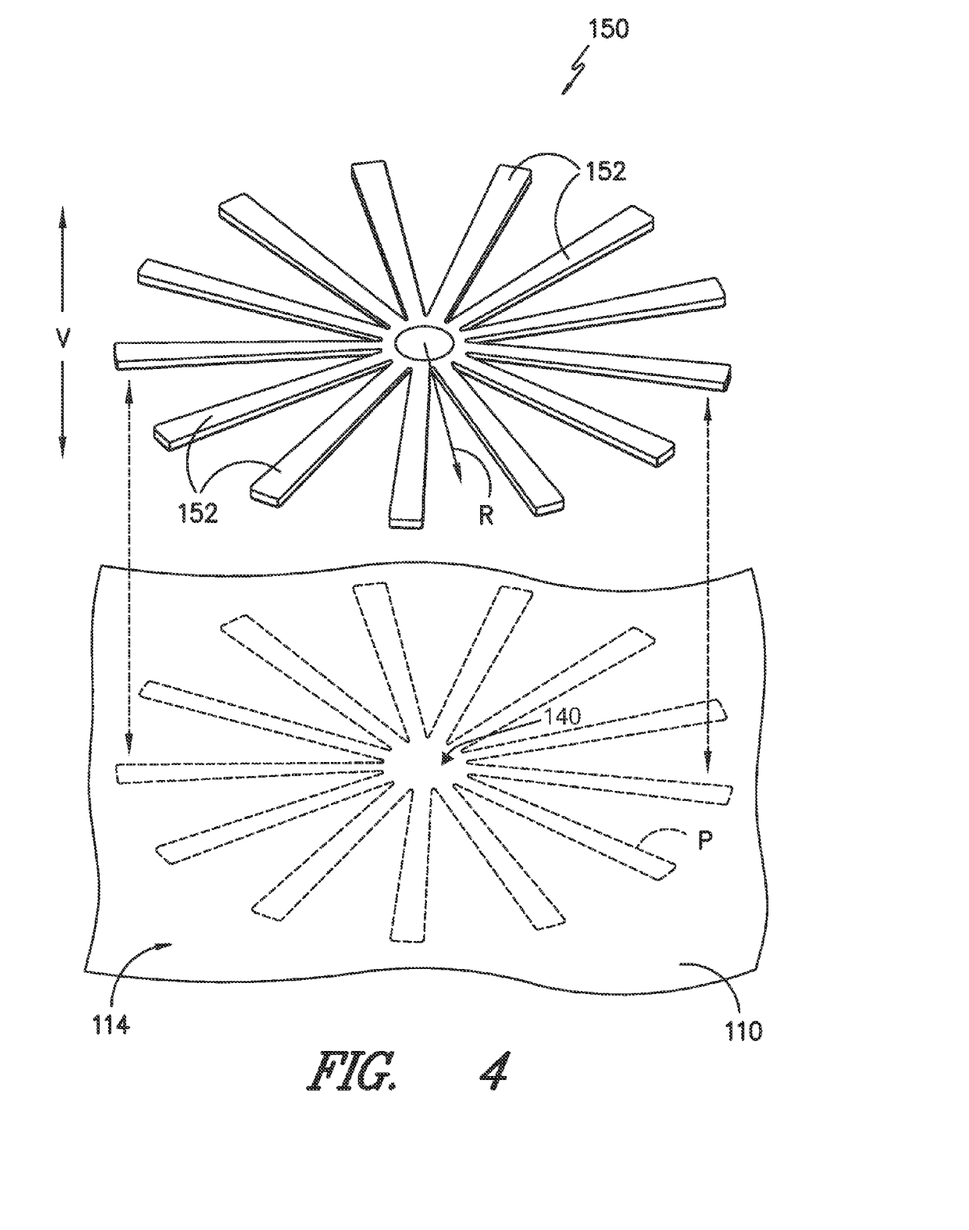
FIG. 4 illustrates a perspective view of an insert of the induction cooktop appliance of FIG. 1. The insert is configured for receipt within one of the plurality of openings of the metal top panel.

FIG. 4 illustrates a perspective view of an insert or grate 150 of induction cooktop appliance 100 (FIG. 1) removed from metal top panel 110. Insert 150 has a plurality of projections 152 and is configured for receipt within one of openings 140 of metal top panel 110. For example, each projection of plurality of projections 152 may be received within a particular one of plurality of slots 142 (FIG. 3). Turning back to FIG. 3, each opening of openings 140 has a shape (outlined with perimeter P) in a plane that is perpendicular to the vertical direction V (shown in FIG. 2). Similarly, turning back to FIG. 4, insert 150 also has a shape in a plane that is perpendicular to the vertical direction V. Further, the shape of insert 150 is complementary to the shape of one of openings 140. Thus, insert 150 can rest or be mounted within one of openings 140 as shown in FIG. 1.

Insert 150 can be mounted within one of openings 140 (FIG. 3) using any suitable method. For example, insert 150 may be mounted using interference fit, high temperature adhesive or both. By resting within openings 140, insert 150 can hinder spills, crumbs, or other food particles from passing through metal top panel 110 (FIG. 3). Further, insert 150 can improve an aesthetic appearance of cooktop appliance 100 (FIG. 1) by filling each vacant openings 140.

Insert 150 may be constructed with any suitable material. For example, insert 150 may be constructed of silicon, a ceramic, or both. Selection of material for insert 150 can assist with hindering eddy current formation within metal top panel 110.

In particular, when insert 150 is received within opening 140, the top of insert 150 sits proud of or above top surface 114 of metal top panel 110, e.g., along the vertical direction V. Thus, insert 150 supports bottom wall 172 of utensil 170 (FIG. 2) such that bottom wall 172 does not contact or touch metal top panel 110. In such a manner, insert 150 can hinder utensil 170 from scratching or damaging metal top panel 110. Further, insert 150 hinders bottom wall 172 of utensil 170 from acting as a conductor for eddy currents within metal top panel 110. Thus, insert 150 facilitates an electrical break between each slot of plurality of slots 142 in order to avoid bridging such electrical break with utensil 170.

Figure 5:
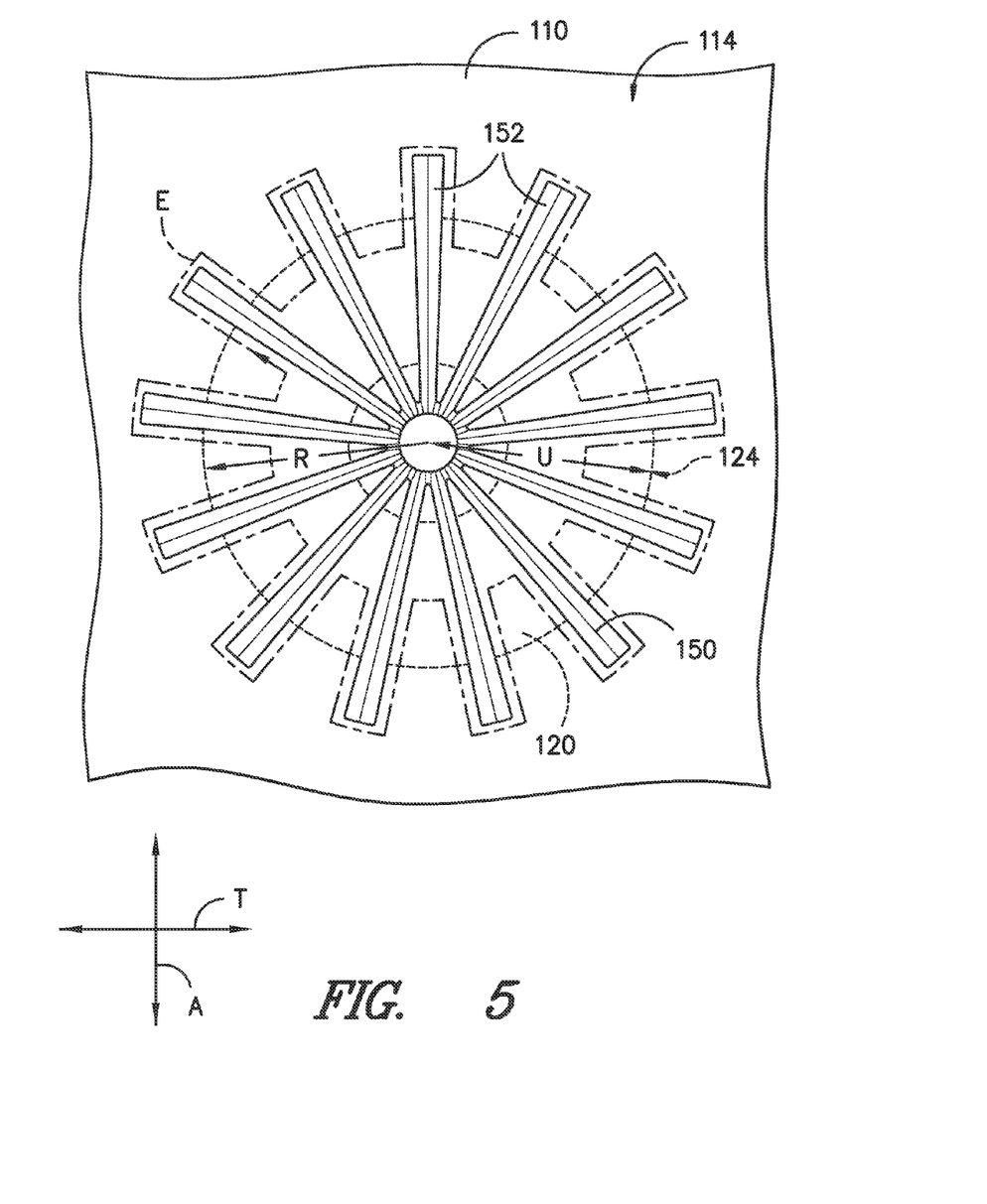
FIG. 5 provides a schematic view of the metal top panel, the insert, and the induction heating element during operation of the induction cooktop appliance of FIG. 1. The insert and/or opening assist with limiting and regulating eddy currents within the metal top panel during operation of the induction cooktop appliance.

FIG. 5 provides a schematic view of insert 150 mounted within opening 140 of metal top panel 110 and induction heating element 120 during operation of induction cooktop appliance 100. Insert 150 and/or opening 140 assist with weakening eddy currents within metal top panel 110 during operation of induction cooktop appliance 100. Because metal top panel 110 is constructed with a metal, induction heating element 120 induces an eddy current (shown with dashed line E) in metal top panel 110. As will be understood by those skilled in the art, if metal top panel 110 did not include insert 150 and/or opening 140, eddy current E would be substantially circular. However, as shown in FIG. 5, insert 150 and/or opening 140 hinder or obstruct circulation of eddy current E such that eddy current E does not have a circular shape because eddy current E travels around each projection of plurality of projections 152 of insert 150 and/or each slot of plurality of slots 142 (FIG. 3). Such obstruction or hindering of eddy current E, weakens eddy current E and impedes heating of metal top panel 110 by eddy current E.

Induction heating element 120 has an outermost edge 124 described by a radius U along the radial direction R. Similarly, as discussed above, each slot of plurality of slots 142 (FIG. 2) has length L along the radial direction R. Length L may be selected such that length L is greater than radius U of induction heating element 120 and slots 142 extend past outermost edge 124 of induction heating element 120 along the radial direction R. Such dimensioning of opening 140 can assist with hindering flow of eddy current E within metal top panel 110. Similarly, constructing insert 150 with a relatively, poor conductive material can assist with hindering flow of eddy current E within metal top panel 110.

Figure 6:
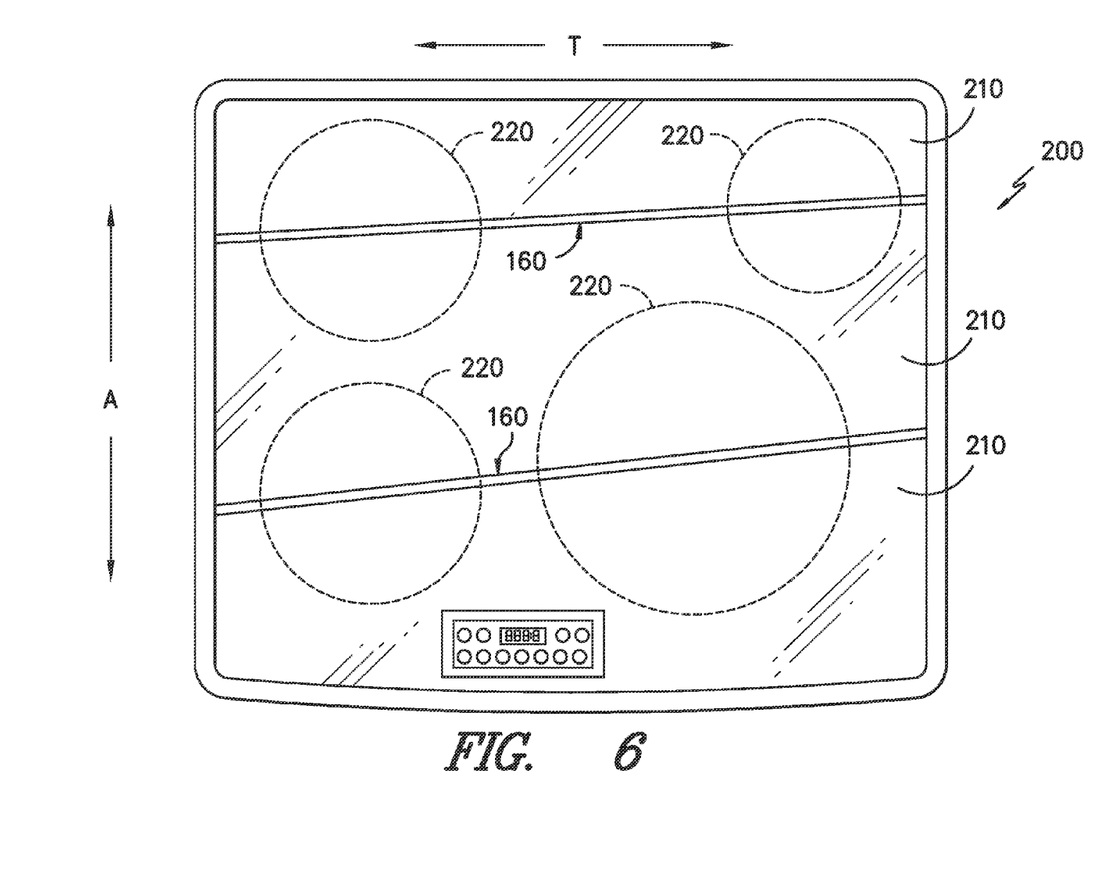
FIG. 6 provides a top, plan view of an induction cooktop appliance according to an additional exemplary embodiment of the present subject matter.

FIG. 6 provides a top, plan view of an induction cooktop appliance 200 according to an additional exemplary embodiment of the present subject matter. Induction cook top appliance 200 defines a transverse direction T and a lateral direction A that are perpendicular. Cooktop appliance 200 is substantially similar to induction cooktop appliance 100 (FIG. 1); however, cooktop appliance 200 includes a plurality of metal top panels 210.

Top panels of plurality of metal top panels 210 are spaced apart from one another, e.g., along the lateral and/or transverse directions A and T. Top panels of plurality of metal top panels 210 also define gaps 160 therebetween. At least a portion of gaps 160 is positioned directly above induction heating coils 220 of cooktop appliance 200. Gaps 160 may be filled with a silicon or ceramic insert (not shown) in a similar manner to cooktop appliance 100 discussed above. Gap 160 can assist with hindering flow of eddy current E (FIG. 5) within metal top panels 210 in a similar manner to metal top panel 110 (FIG. 3) discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An induction cooktop appliance, comprising:
an induction heating coil;
a metal top panel having a top surface and a bottom surface positioned opposite the top surface, the top surface of said metal top panel configured for supporting cooking utensils, the metal top panel positioned above said induction heating coil with the bottom surface facing the induction heating coil and the top surface facing away from the induction heating coil, said metal top panel also defining an opening configured for defining a predetermined tortuous eddy current path in the metal top panel based on dimensions of the opening, the opening located above said induction heating coil, the opening extending entirely though said metal top panel from the top surface of said metal top panel to the bottom surface of said metal top panel along a vertical direction, the opening defining a radial direction and a circumferential direction, the opening having a plurality of slots that extend along the radial direction, the plurality of slots being spaced apart from one another along the circumferential direction, a first portion of the opening directly overlies the induction heating coil and a second portion of the opening extends radially beyond the induction heating coil, wherein the metal top panel consists of a uniform metal material.

2. The induction cooktop appliance of claim 1, wherein each slot of the plurality of slots extends longitudinally along the radial direction by more than about three inches.

3. The induction cooktop appliance of claim 1, wherein the plurality of slots is uniformly distributed about the circumferential direction.

4. The induction cooktop appliance of claim 1, wherein the plurality of slots comprises at least ten slots.

5. The induction cooktop appliance of claim 1, further comprising an insert received within the opening of said metal top panel.

6. The induction cooktop appliance of claim 5, wherein said insert is constructed of silicon or a ceramic.

7. The induction cooktop appliance of claim 5, wherein said metal top panel defines a vertical direction, the opening of said metal top panel having a shape in a plane that is perpendicular to the vertical direction, said insert also having a shape in a plane that is perpendicular to the vertical direction, the shape of said insert being complementary to the shape of the opening of said metal top panel.

8. The induction cooktop appliance of claim 1, wherein said metal top panel is constructed of stainless steel.

9. The induction cooktop appliance of claim 8, wherein the stainless steel is 304 or 316 grade stainless steel.

10. The induction cooktop appliance of claim 1, wherein said metal top panel defines a vertical direction, the opening of said metal top panel having a perimeter in a plane that is perpendicular to the vertical direction, the perimeter being greater than about one hundred inches.

11. The induction cooktop appliance of claim 1, wherein said induction heating element has an outermost edge described by a radius along the radial direction, each slot of the plurality of slots having a length along the radial direction that is greater than the radius of said induction heating element.

12. The induction cooktop appliance of claim 11, wherein the length of the plurality of slots is more than about one inch greater than the radius of said induction heating element.

\* \* \* \* \*

UNITED STATES PATENT AND TRADEMARK OFFICE
CERTIFICATE OF CORRECTION

PATENT NO. : 9,491,809 B2
APPLICATION NO. : 13/670572
DATED : November 8, 2016
INVENTOR(S) : Timothy Scott Shaffer It is certified that error appears in the above-identified patent and that said Letters Patent is hereby corrected as shown below:

In the Claims

In Line 49 of Column 7, Claim 1, "though" should be "through"

Signed and Sealed this
Twenty-ninth Day of May, 2018

Andrei Iancu
*Director of the United States Patent and Trademark Office*